United States Patent [19]

DeFries et al.

[11] Patent Number: 4,720,218
[45] Date of Patent: Jan. 19, 1988

[54] COMBINATION DRILLING AND DRESSING BIT

[75] Inventors: Rene F. DeFries; Arthur D. Riley, both of Winnipeg, Canada

[73] Assignee: The Boeing Company, Seattle, Wash.

[21] Appl. No.: 45,613

[22] Filed: May 1, 1987

[51] Int. Cl.[4] .............................................. B23B 51/00
[52] U.S. Cl. .................................... 408/145; 408/118; 408/201; 408/225; 51/181 R; 51/206 R; 407/32; 407/1
[58] Field of Search ............... 408/144, 145, 199, 200, 408/201, 223, 224, 225, 228, 118, 27; 407/1, 32, 118; 144/218; 51/181 R, 206 R, 283 R

[56] References Cited

U.S. PATENT DOCUMENTS

| 362,934 | 5/1887 | Champion | 408/224 |
|---|---|---|---|
| 2,057,421 | 10/1936 | Dickson | 219/34 |
| 2,272,348 | 2/1942 | Newman | 149/20 |
| 2,501,000 | 3/1950 | Murphey | 51/181 |
| 2,705,515 | 4/1955 | Walker | 408/224 |
| 2,725,766 | 12/1955 | Van Heukelom | 408/81 |
| 2,978,846 | 4/1961 | Barron | 51/206 |
| 3,017,790 | 1/1962 | Werle | 77/70 |
| 3,153,354 | 10/1964 | Prince | 77/58 |
| 3,202,228 | 8/1965 | Schuster | 175/53 |
| 3,739,461 | 6/1973 | Cupler | 29/557 |
| 3,762,831 | 10/1973 | Nicholson | 408/146 |
| 4,116,578 | 9/1978 | Gelfand et al. | 408/225 |
| 4,480,952 | 11/1984 | Jeremias | 408/228 |

FOREIGN PATENT DOCUMENTS

| 10414 | 1/1983 | Japan | 408/118 |
|---|---|---|---|
| 209256 | 3/1968 | U.S.S.R. | |
| 552181 | 7/1977 | U.S.S.R. | 51/206 R |

OTHER PUBLICATIONS

A. J. Koch, "Abrasive Drill for Resilient Materials", NASA Technical Briefs, Fall, 1980, Lewis Research Center No. LEW-13411.

Primary Examiner—Z. R. Bilinsky
Assistant Examiner—Daniel W. Howell
Attorney, Agent, or Firm—Joan H. Pauly

[57] ABSTRACT

The bit (1, 101, 201) includes a pointed tapered drill portion (10, 110, 210) with cutting edges (14, 114, 214), an abrasive frustoconical grinder portion (20, 120, 220), and an abrasive cylindrical reamer portion (30, 130, 230). The drill portion (10, 110, 210) produces a hole. The grinder portion (20, 120, 220) grinds and enlarges the hole. The reamer portion (30, 130, 230) finishes the hole. The drill portion (10, 110, 210) is carried by a shaft (12, 112, 212) that is received into an axial opening (40, 140, 240) through the grinder and reamer portions (20, 30, 120, 130, 220, 230). The drill portion (10) and grinder portion (20) may form a substantially continuous taper. In another embodiment, the drill portion (110) has an arrowhead configuration. In another embodiment, a radial slot (224) extends through the grinder portion (220), and the drill portion (210) extends axially and radially from the slot (224).

9 Claims, 22 Drawing Figures

COMBINATION DRILLING AND DRESSING BIT

DESCRIPTION

1. Technical Field

This invention relates to bits for drilling and dressing holes and, more particularly, to a combination bit having a pointed tapered outer end for producing a hole and frustoconical and cylindrical abrasive surface portions for enlarging and finishing the hole.

2. Background Art

In the aircraft industry, the use of lightweight fiber reinforced composite materials has been steadily increasing over the past few years. As the use of such materials expands, there will be an increased need for a cost effective method of producing high quality holes in such materials with dimensions within narrow tolerances. A number of problems arise in using known drilling and grinding techniques to produce holes in fiber reinforced composite materials such as graphite fiber reinforced bismaleimide (BMI). These problems include delamination and splintering of the material and fiber breakout. Such phenomena are unacceptable in most applications for a number of reasons, including weakening of the structure through which the hole extends around the hole area.

The assignee of the applicants tested a number of methods of drilling holes in cargo heat duct tubes made from graphite reinforced BMI. The methods tested included laser drilling, ultrasonic assisted drilling, ultrasonic impact grinding, drilling with a carbide bit and special drill jig, and punching. Of these methods, the drilling with the carbide bit and special jig produced the best results. The special jig supported both the inner diameter and the outer diameter of the tube, and the bit was operated through a close tolerance bushing. The applicants tested the carbide drill bit and special jig method of producing holes at various drilling speeds. The applicants were unable to produce good quality holes. Under a 35 power magnification, delaminations in all of the holes were highly visible.

The applicants also experimented with various shapes of diamond hones and grinders. A conical hone plated with 150 grit diamonds and having a cone angle of 20° leading to a sharp point was tested. Very good quality holes were produced by the conical hone mounted in a high speed router with the feed controlled by a drill press. However, after drilling only a few holes, the diamond wore off the point and the hone could no longer produce holes without delaminations. In addition, the size of the hole was difficult to control because of the taper of the hone.

The applicants also tested a carbide bit sharpened on four sides to a long tapered point. Holes were produced using a high speed drilling rate and controlled rate of feed. The carbide bit produced holes easily in an unsupported tube, i.e. without a special jig, and showed very little wear. However, all of the holes exhibited delamination.

The patent literature includes a number of examples of special purpose and combination bits. U.S. Pat. No. 362,934, granted May 17, 1987, to J. P. Champion, discloses a combined borer and reamer. The outer borer portion of the tool fits into a radial slot in the main reamer portion and is described as being of nearly the full width of the reamer so that only one action is required to bore and smooth the hole. The borer portion has a flattened configuration and a main face with a frustoconical tip and axially straight side edges extending inwardly from the tip. The reamer head is cylindrical and has longitudinal grooves. The diameter of the cylindrical reamer head is substantially equal to the diameter of the flat face of the borer. Above the reamer head, the shaft of the tool has a spiral thread, apparently for removing chips of material.

U.S. Pat. No. 2,978,846, granted Apr. 11, 1961, to L. H. Barron, discloses a drill and countersink tool. In each of the three embodiments shown in the patent, the tool has a cylindrical boring head with a rounded tip which is coated with diamond grits embedded in nickel plating. The boring head may be an integral continuation of the shank of the tool. The cylindrical portion of the boring head inward of the diamond studded tip apparently has a smooth surface. Each of the embodiments has an enlargement on the shank inward of the boring head. In a first embodiment, the enlargement has a diamond grit coated frustoconical surface and then a smooth cylindrical surface. In a second embodiment, the enlargement has a diamond coated radial surface, a contiguous diamond coated frustoconical surface, and then a smooth cylindrical surface. In a third embodiment, the enlargement has adjacent radial and cylindrical diamond coated surfaces, and a frustoconical diamond coated surface inward of the coated cylindrical surface and separated therefrom by a gap. The tool is described as being suitable for drilling, counterboring, and countersinking materials such as laminated plastics. The coated frustoconical and radial surfaces of the first two embodiments and the frustoconical surface of the third embodiment form countersinks. The radial and cylindrical coated surfaces of the third embodiment form a counterbore.

U.S. Pat. No. 3,202,228, granted Aug. 24, 1965, to A. C. Schuster, discloses a drill bit and apparatus for enlarging holes in materials such as masonry. The cutting bit is generally conical with longitudinal or spiral rows of carbide particles fluxed to the outer surface and grooves between the rows. A feel rod extends through an axial hole in the bit and engages the existing hole to align the bit with the existing hole and secure the bit in position. A modified embodiment of the cutting bit has a forward frustoconical portion and a rear cylindrical portion, with the diameter of the rear portion being the same as the major diameter of the frustoconical portion. In another embodiment, the cutting bit has frustoconical cutting surface and, forward of such surface, a cylindrical alignment portion with a tapered end for aligning the cutting bit when a hole much larger than the feel rod is being enlarged.

Soviet patent document No. 209,256, dated Mar. 6, 1968, discloses a tool for restoring eyelet yard guides. The tool has a conical work portion mounted on a spindle. The work portion includes a frustoconical grinding wheel and a leather tip positioned axially outwardly of the grinding wheel. The wheel is used to remove the worn part of the yarn guide which is then polished by the leather tip.

An abrasive drill for resilient materials is disclosed in an article by A. J. Koch, entitled "Abrasive Drill for Resilient Materials", NASA Technical Briefs, Fall 1980, Lewis Research Center No. LEW-13411. The drill bit has a cylindrical shank with a pointed tip for piercing the material. Inwardly of the pointed tip, the shank is plasma-sprayed with a suitable hard abrasive coating. The tool is designed to overcome the problem of nonuniform and nonreproducible holes caused by deformation of resilient materials.

U.S. Pat. No. 2,272,348, granted Feb. 10, 1942, to M. S. Newman, discloses a generally cone-shaped head for treating animal skins. The head has abrasive segments separated by longitudinally extending blades. A fine abrasive material is glued onto the surfaces of the segments. U.S. Pat. No. 2,501,000, granted Mar. 21, 1950, to C. E. Murphey, discloses a valve grinding tool having a tapered end with longitudinal reaming teeth. U.S. Pat. No. 3,017,790, granted Jan. 23, 1962, to O. P. Werle, discloses a high speed cutting tool having layers of material, moving from axis to outer circumference, with varying degrees of resistance to pressure and surface cutting speeds. U.S. Pat. No. 3,739,461, granted June 19, 1973, to J. A. Cupler, II, discloses a method of enlarging or reaming a bore in a laminated workpiece. In the method, a straight fluted reaming tool is inserted into the bore without rotation and is then rotated to finish the bore. U.S. Pat. No. 3,762,831, granted Oct. 2, 1973, to J. M. Nicholson, discloses a self-centering chamfer tool having a cutting blade which has an adjustable axial position and projects through a diametrical slot in the tool body. The West German patent application of J. Lach, No. 2,253,617, dated May 16, 1974, discloses a holder for diamond tipped tools having a head and tip axially adjustable relative to a shank.

The above patents and other literature and the prior art that is discussed and/or cited therein should be carefully considered for the purpose of putting the present invention into proper perspective relative to the prior art.

DISCLOSURE OF THE INVENTION

The subject of the invention is a bit for producing and dressing holes. According to an aspect of the invention, the bit comprises a pointed tapered drill portion, a grinder portion, and a reamer portion. The drill portion includes sharp cutting edge means for producing a hole and has a first maximum diameter. The grinder portion includes generally frustoconical abrasive outer surface portions extending generally axially inwardly from the drill portion for enlarging the hole. The grinder portion has a second maximum diameter larger than the first maximum diameter. The reamer portion includes essentially cylindrical abrasive outer surface portions that are axially inward continuations of the abrasive outer surface portions of the grinder portion for finishing the hole.

The bit of the invention solves the problems discussed above encountered when drilling holes in fiber reinforced composite materials. When the bit of the invention is used to drill a hole in such a material, the hole is first produced by the cutting action of the drill portion and then is enlarged and finished by the grinding action of the grinder and reamer portions. The result is a high quality hole with no delaminations, fiber breakout, or splintering around the hole. The initial cutting action of the drill portion may cause some damage to the surrounding composite material in the form of delaminations, fiber breakout, or splintering. However, the subsequent grinding action of the grinder and reamer portions removes the damaged areas of the composite material and produces a smooth damage-free hole sidewall. The cylindrical shape of the abrasive outer surface portions of the reamer portion also permit the hole size to be controlled well within allowable tolerances.

The drill of the invention does not require any special back-up tools for supporting the workpiece and eliminates the need to drill through close tolerance bushings. Therefore, the bit may be used with a relatively simple drill jig. In addition, the bit is very well suited for use with an automatic feed control unit. The ability to use a simple drill jig and automatic feed control results in significant savings in the time required for carrying out the drilling process and the cost of the drilling process. The time and cost savings are further increased because the production, enlarging, and finishing of the hole can all be accomplished in one operation. There is no need for secondary reaming, which is frequently required with known drilling techniques.

A preferred feature of the invention is a shaft that has a first end which carries the drill portion and that is received into an axial opening extending through the grinder and reamer portions. The shaft is dimensioned to be received into such opening with its first and second ends projecting axially therefrom. The bit also includes means for detachably securing the grinder portion and reamer portion to the shaft. This preferred feature of the invention has the advantage of simplifying manufacture, assembly, and maintenance of the bit. During production, the shaft and drill portion may be easily and quickly replaced with a sharpened drill portion and shaft so that production delays are minimized. The grinder and reamer portions may also be separately replaced if the need should arise. In the preferred embodiments of the invention, the grinder portion and the reamer portion are integrally formed. The drill portion and the shaft may also be integrally formed to further simplify manufacture, assembly, and maintenance. The shaft and drill portion may, for example, be formed from a carbide blank that is sharpened on one end to form the cutting edge means. This arrangement simplifies both fabrication and resharpening of the drill portion.

The details of the drill portion, grinder portion, and reamer portion and their interrelationships may be varied in a number of ways. In a first preferred embodiment, the drill portion and grinder portion meet each other along a substantially circular interface with a diameter substantially equal to the first maximum diameter. The drill portion and grinder portion together form a substantially continuous taper. This embodiment produces excellent quality holes and is relatively simple in structure. However, in tests of this embodiment, there was a hesitation when the cutting action of the drill portion was completed and the grinding action of the grinding portion was about to start. In addition, the circular interface requires a very fine edge of the grinder portion where it meets the drill portion. This fine edge wears fairly quickly and is very hard to control during manufacture.

In a second preferred embodiment of the invention, the drill portion has an axially inner end with a diameter equal to the first maximum diameter. The grinder portion increases in diameter from a minimum diameter less than the first maximum diameter radially adjacent to the inner end of the drill portion, to its second maximum diameter. This causes the abrasive outer surface portions of the grinder portion to gradually engage sidewalls of holes. Such gradual engagement eliminates the problem of hesitation encountered in connection with the first embodiment. In addition, the arrowhead-like configuration of the drill portion allows reinforcing fibers, such as graphite hairs, that may have been missed on the downstroke to be trimmed off on the upstroke. The relationship between the drill portion and the grinder portion also eliminates the need for a fine edge on the grinder portion and the need for customizing the drill portion to match the dimensions of the grinder portion. Thus, manufacture can be standardized, greatly reducing its cost. However, there are limitations on the use of this embodiment. The drill portion can only be resharpened a limited number of times. Each time the drill portion is resharpened, its dimensions relative to the grinder portion become smaller and, when they are reduced below allowable limits, the drill portion must be replaced.

In the third preferred embodiment of the invention, the grinder portion has an axially outer end with a diameter less than the first maximum diameter. A slot extends radially through the grinder portion and opens onto its outer end. The drill portion is received into the slot and projects axially and radially outwardly from the slot at the outer end of the grinder portion and radially outwardly from the slot from such outer end to a location intermediate such outer end and the reamer portion. When the preferred feature of a shaft extending through an axial opening in the grinder and reamer portions is included in this embodiment, the axial opening terminates in the radial slot.

The third preferred embodiment is currently the most preferred embodiment. This embodiment eliminates the problem of hesitation discussed above. Hesitation is not experienced because, by the time the cutting action of the drill portion is completed, the grinder portion is already well into the hole and has begun to engage the sidewalls of the hole. In the third embodiment, the manufacture of both the drill portion and the grinder and reamer portions may be standardized for mass production. In addition, the drill portion may be resharpened many times and still retain its usefulness. Thus, the drill portion has a much longer life than the drill portion of the second embodiment.

The above-discussed and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

The drawings show bits 1, 101, 201 that are constructed according to the invention and that also consititute the best modes of the invention currently known to the applicant. FIGS. 1-4 illustrate the bit 1 being used to produce and finish a hole in a fiber reinforced composite material tube 4. It is anticipated that the primary use of the bit of the invention will be in drilling holes in the type of material shown in FIGS. 1-4. However, it is of course to be understood that the bit of the invention may also be used to advantage for drilling and finishing holes in other types of material having either a convex configuration like the tube 4 or some other configuration.

Figures 21, 22:
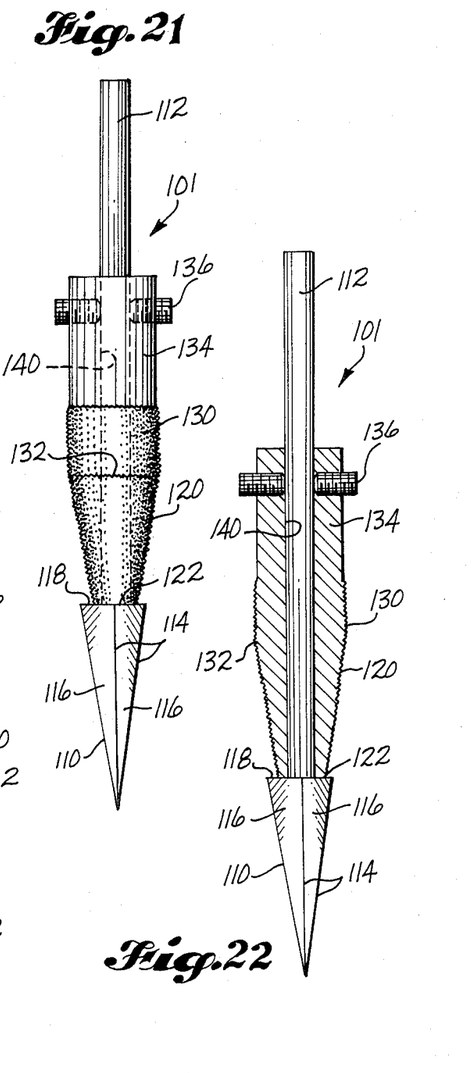
FIGS. 21 and 22 are like FIGS. 19 and 20 except that they show the second preferred embodiment.

The drawings show three embodiments of the combination bit of the invention. A first preferred embodiment is shown in FIGS. 1-4, 19, and 20. A second preferred embodiment is shown in FIGS. 21 and 22. A third preferred embodiment is shown in FIGS. 5-18.

Each of the three embodiments of the bit 1, 101, 201 includes a pointed tapered drill portion 10, 110, 210, a grinder portion 20, 120, 220, and a reamer portion 30, 130, 230. The drill portion 10, 110, 210 has sharp longitudinal cutting edges 14, 114, 214. The grinder portion 20, 120, 220 has generally frustoconical abrasive outer surface portions extending generally axially inwardly from the drill portion 10, 110, 210. The grinder portion 20, 120, 220 has a maximum diameter larger than the maximum diameter of the drill portion 10, 110, 210. The reamer portion 30, 130, 230 has an essentially cylindrical abrasive outer surface that is an axially inward continuation of the abrasive surface portions of the grinder portion 20, 120, 220.

Figures 1, 2, 3, 4:
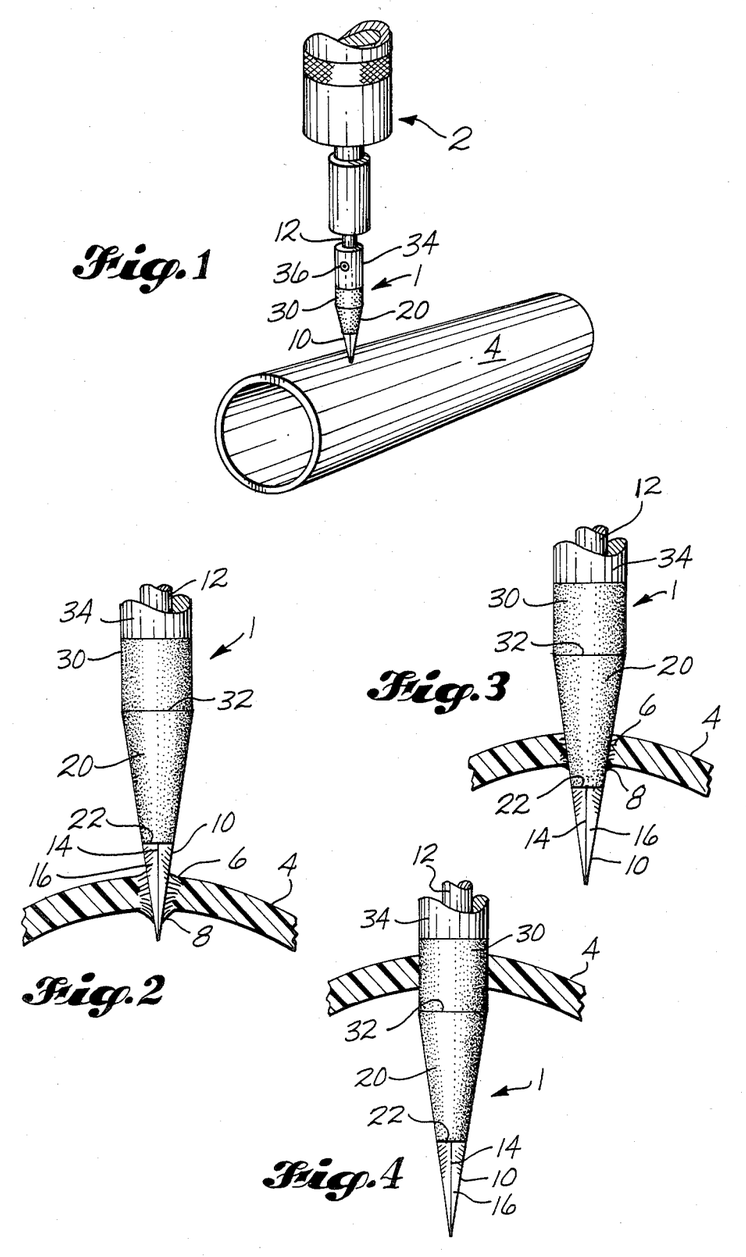
FIG. 1 is a pictorial view of the first preferred embodiment mounted in a drill press and positioned to drill a hole in a tube.
FIG. 2 is an elevational view of the first preferred embodiment with the drill portion penetrating the tube sidewall, with portions cut away and portions shown in section.
FIG. 3 is like FIG. 2 except that it shows the grinder portion engaging the hole produced by the drill portion.
FIG. 4 is like FIGS. 2 and 3 except that it shows the reamer portion finishing the hole.

The functioning of the bit of the invention is illustrated in FIGS. 1-4, which show the first preferred embodiment 1 being used to drill a hole in a graphite/bismaleimide filament wound cargo heat duct tube 4. In FIG. 1, the bit 1 is shown mounted on a conventional drill press 2. It is anticipated that the bit of the invention will be used primarily with the type of drill mechanism 2 shown in FIG. 1. However, it is of course to be understood that the bit of the invention may also be mounted on a variety of other types of drilling machines. The tube 4 or other workpiece may be held in position by any suitable means (not shown). As noted above, no special jig or support for the tube 4 is required.

FIG. 1 shows the bit 1 in position to begin drilling the hole in the tube 4. The drilling operation is carried out by rotating the bit 1 in a known manner. FIG. 2 shows the drill portion 10 of the bit 1 producing the hole in the tube 4. As illustrated in FIG. 2, the cutting action of the drill portion 10 is causing delaminations 6 and fiber breakout 8 in the tube material surrounding the hole. FIG. 3 illustrates the drilling operation after the drill portion 10 has completed its cutting action and the abrasive grinder portion 20 has entered the hole. The abrasive frustoconical surface of the grinder portion 20 grinds the sidewall of the hole to enlarge the hole and eliminate and smooth out the delaminations 6 and fiber breakout 8. FIG. 3 shows the delaminations 6 and fiber breakout 8 almost completely eliminated. FIG. 4 illustrates the final stage of the drilling operation in which the reamer portion 30 has entered the hole to finish the sidewalls of the hole. The grinding action of the cylindrical abrasive outer surface of the reamer portion 30 produces a smooth finished hole with no delaminations, splintering, or fiber breakout.

In each of the three preferred embodiments, the grinder and reamer portions 20, 30, 120, 130, 220, 230, are integrally formed and have an opening 40, 140, 240 extending axially therethrough. The drill portion 10, 110, 210 is carried by a first end of a shaft 12, 112, 212 that is dimensioned to be received into the opening 40, 140, 240 with its two opposite ends projecting axially from the opening 40, 140, 240. Means is provided for detachably securing the grinder and reamer portions 20, 30, 120, 130, 220, 230 to the shaft 12, 112, 212. In each of the preferred embodiments, this means includes a smooth surfaced cylindrical extension 34, 134, 234 of the reamer portion 30, 130, 230. Set screws 36, 136, 236 are received into suitable holes in the axial extension 34, 134, 234 and engage the shaft 12, 112, 212.

Figures 19, 20:
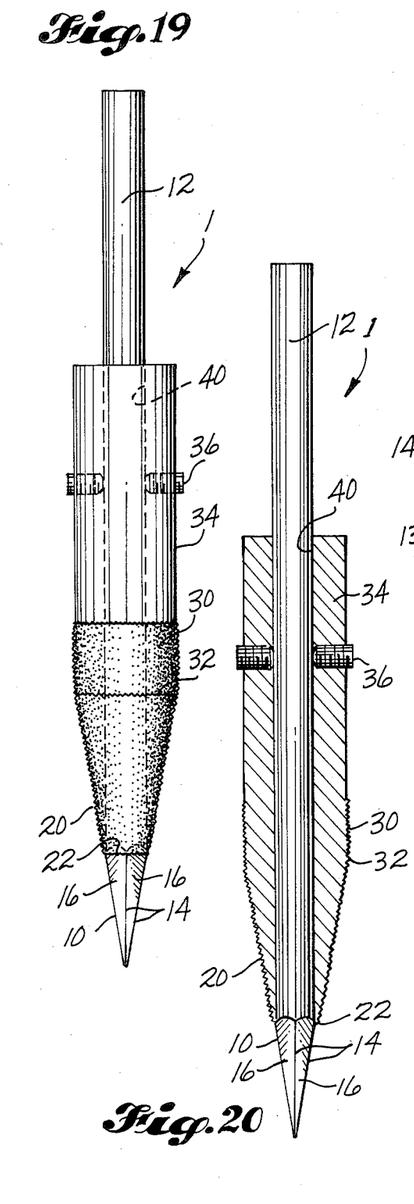
FIG. 19 is an elevational view of the first preferred embodiment.
FIG. 20 is like FIG. 19 except that the reamer and grinder portions are shown in section.

The details of the structure of the first preferred embodiment are best seen in FIGS. 19 and 20. The drill portion 10 is formed integrally with the shaft 12. The drill portion 10 is formed by machining and sharpening the outer end of the shaft 12. The sharpened outer end which forms the drill portion 10 has four substantially flat faces 16 which define sharp longitudinal cutting edges 14. The drill portion 10 and the grinder portion 20 meet each other along a substantially circular interface 22 formed along the outer end of the grinder portion 20. The diameter of the interface 32 is substantially equal to the maximum diameter of the drill portion 10, and the drill portion 10 and grinder portion 20 together form a substantially continuous taper. This taper continues axially inwardly along the grinder portion 20 to the interface 32 between the grinder portion 20 and the reamer portion 30. At this interface 32, the grinder portion 20 reaches its maximum diameter which is equal to the diameter of the reamer portion 30.

The second preferred embodiment is shown in FIGS. 21 and 22. In this embodiment, the drill portion 110 has a configuration like an arrowhead and is attached to the axially outer end of the shaft 112. Like the drill portion 10 of the first embodiment, the drill portion 110 of the second embodiment has four substantially flat faces 116 and longitudinal cutting edges 114. The axially inner end 118 of the drill portion 110 has a diameter equal to the maximum diameter of the drill portion 110. The grinder portion 120 varies in diameter from a minimum diameter less than the maximum diameter of the drill portion 110 radially adjacent to the inner end 118 of the drill portion 110, to its maximum diameter at its interface 132 with the reamer portion 130. The configuration of the bit 101 with the diameter of the grinder portion 120 being less than the diameter of the drill portion 110 at its interface 122 with the drill portion 110, causes the abrasive frustoconical outer surface of the grinder portion 120 to gradually engage the sidewall of a hole being drilled to prevent hesitation when the grinding stage of the operation commences.

Figures 5, 6, 7, 8:
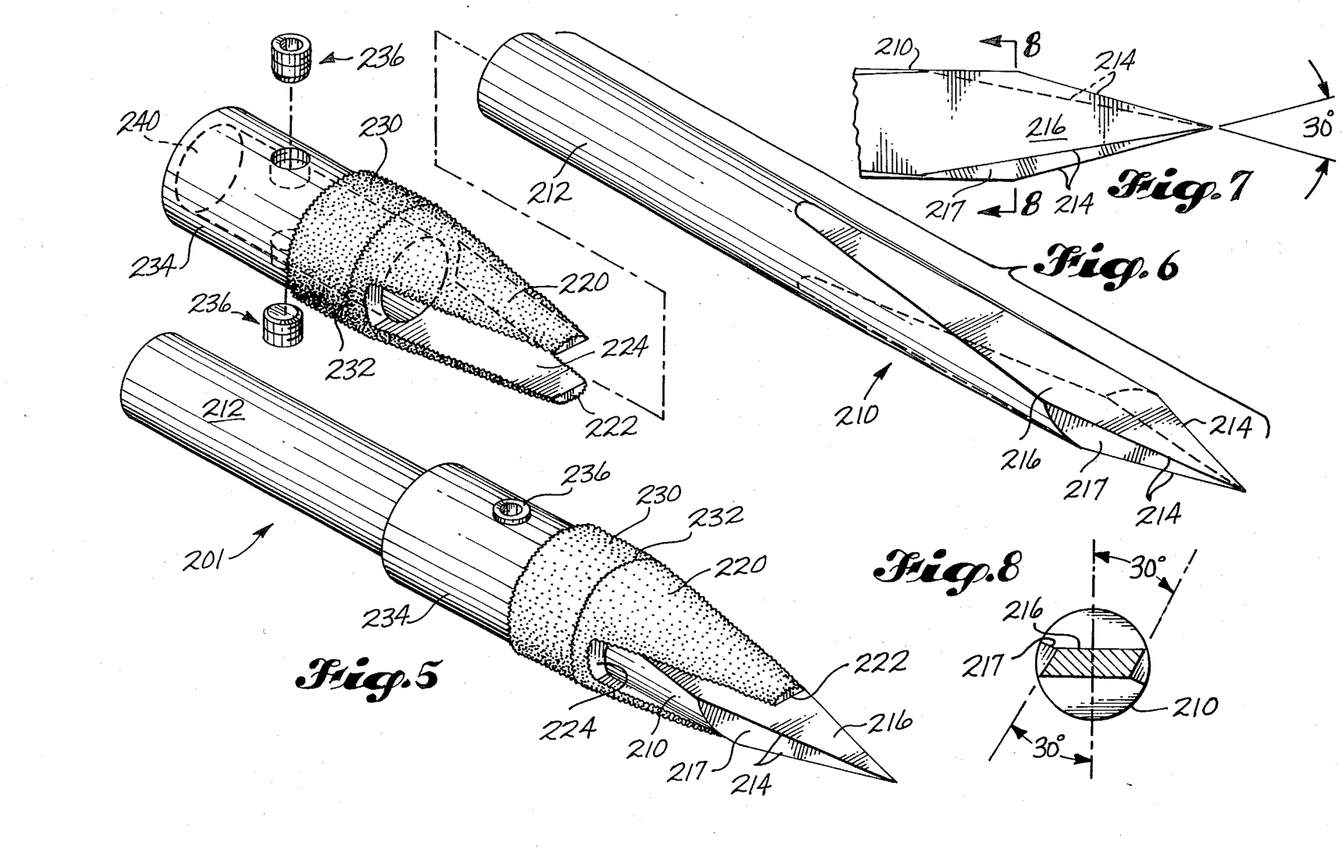
FIG. 5 is a pictorial view of the third preferred embodiment of the invention.
FIG. 6 is an exploded pictorial view of the embodiment shown in FIG. 5.
FIG. 7 is an elevational view of the tip of the drill portion shown in FIGS. 5 and 6.
FIG. 8 is a sectional view taken along the line 8—8 in FIG. 7.

The third most preferred embodiment of the invention is shown in FIGS. 5-18. In this embodiment, like the first embodiment, the drill portion 210 is integrally formed on the shaft 212 by machining and sharpening the outer end of the shaft 212. Like the first two embodiments, the drill portion 210 has substantially flat faces 216, 217 and longitudinal cutting edges 214. In the third embodiment, there are two major faces 216 and two smaller faces 217. The configuration of the drill portion 210 and its cutting edges 214 and faces 216, 217 are best seen in FIGS. 5-8. FIGS. 7 and 8 illustrate the degree of bevel of the major faces 216. As shown in FIGS. 7 and 8, the optimum degree of bevel known to date is 30°. Current test results also indicate that the optimum degree of bevel of the minor faces 217 is 6° to 8° and the optimum cone angle of the grinder portion 220 is 20°. These angles may, of course, be varied without departing from the invention and are subject to modification if future test results indicate different optimum values.

As in the other embodiments, the grinder and reamer portions 220, 230 are integrally formed and meet along an interface 232 which has a diameter equal to the maximum diameter of the grinder portion 220 and the diameter of the cylindrical reamer portion 230. The axially outer end 222 of the grinder portion 220 has a diameter that is less than the maximum diameter of the drill portion 210. A slot 224 extends radially through the grinder portion 220 from its outer end 222 to a location intermediate the outer end 222 and the interface 232 with the reamer portion 230. The slot 224 opens onto the outer end 222 and forms the outer portion of the opening 240 that extends axially through the grinder and reamer portions 220, 230.

The shaft 212 is received into the opening 240, with the drill portion 210 being received into the slot 224. The drill portion 210 projects axially and radially outwardly from the slot 224. At the outer end 222 of the grinder portion 220, the drill portion 210 projects both axially and radially outwardly from the slot 224. The drill portion 210 continues to project radially outwardly from the slot 224 moving axially inwardly from the outer end 222 of the grinder portion 220 to a location intermediate the outer end 222 and the interface 232. This location is axially outward of the inner end of the slot 224. For example, the drill portion 210 may project radially from the outer approximately 3/5ths of the slot 224.

Figures 9, 10, 11, 12, 13, 14, 15, 16, 17, 18:
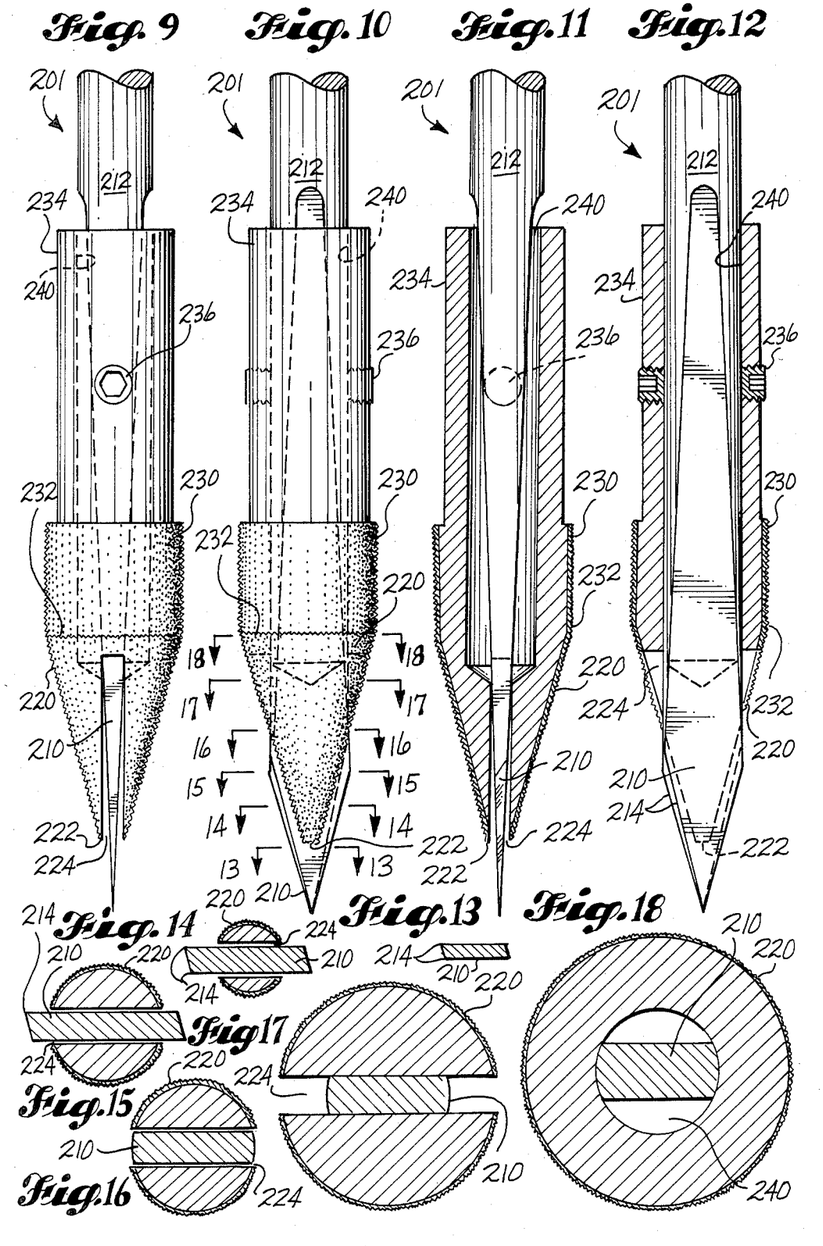
FIG. 9 is a side elevational view of the embodiment shown in FIGS. 5 and 6.
FIG. 10 is a front elevational view of the embodiment shown in FIGS. 5 and 6.
FIG. 11 is like FIG. 9 except that it shows the grinder and reamer portions in section.
FIG. 12 is like FIG. 10 except that it shows the grinder and reamer portions in section.
FIGS. 13-18 are sectional views taken along the lines 13—13-18—18, respectively, in FIG. 10.

FIGS. 13-18 are sectional views of the bit 201 illustrating the functioning of the drill portion 210 and grinder portion 220 and the gradual transition from the cutting action of the drill portion 210 to the grinding action of the grinder portion 220. FIGS. 13-18 are taken along the lines 13—13-18—18 in FIG. 10. These reference lines also show the degree of penetration of the bit 201 illustrated in the corresponding sectional view. In FIG. 13, only the drill portion 210 has penetrated the workpiece and the cutting action is taking place. In FIGS. 14 and 15, the cutting action of the drill portion 210 is continuing, and the grinder portion 220 is gradually entering the hole being cut by the drill portion 210. In FIGS. 14 and 15, the grinder portion 220 is not yet making contact with the hole sidewall. FIG. 16 shows the point at which the grinder portion 220 has come into gradual contact with the hole sidewall, and the drill portion 210 has just moved out of contact with the hole sidewall. FIGS. 17 and 18 illustrate the grinder portion 220 grinding and enlarging the hole. At the point shown in FIG. 18, the enlarging of the hole is being completed and the reaming and smoothing action of the reamer portion 230 is about to commence.

The functioning of the bit 201 illustrated in FIGS. 10 and 13-18 ensures a smooth drilling operation and helps make close tolerance holes possible. The structure of the third embodiment of the bit 201 also has the advantage of being fully adaptable to mass production. Both the shaft 212 and drill portion 210 and the grinder portion 220 and reamer portion 230 can be manufactured with standard dimensions without any need for customizing the parts of the bit 201 to fit one another. In addition, the drill portion 210 may be sharpened many times without affecting its functioning or its interaction with the grinder and reamer portions 220, 230. Because of its gradual engagement with the hole sidewall, the grinder portion 220 has a long useful life. For example, a diamond grit plated grinder portion 220 can be used to drill several hundred holes in graphite fiber reinforced bismaleimide and obtain excellent hole quality in each of the several hundred holes.

In each of the embodiments, the parts of the bit 1, 101, 201 may be made from various materials. An example of a suitable material for the drill portion 10, 110, 210 is a high quality metal carbide. In the first and third embodiments, the drill portion 10, 210 and the shaft 12, 212 may be easily manufactured by machining the faces 16, 216, 217 and cutting edges 14, 214 of the drill portion 10, 210 onto the end of a carbide blank. The grinder and reamer portions 20, 30, 120, 130, 220, 230 may be made from a metal of suitable strength with the abrasive surfaces plated thereon by a diamond grit plating process. Either electroplating or physical bonding of the diamond grit may be employed. A suitable grit is 150 industrial diamond grit.

The third embodiment of the bit 201 has been tested drilling holes in two-ply filament wound graphite fiber reinforced bismaleimide with the following excellent results.

EXAMPLE 1

Twenty-four holes with a diameter of 0.324±0.004 inch were drilled. There were twenty-one holes of excellent quality and two good quality holes. The remaining hole was only of average quality due to a feed speed that was too high. Following the drilling of the twenty-fourth hole, the diamond grit showed 4% wear, and the carbide drill 96% wear. In other words, the diamond grit showed very little wear, and the carbide drill was ready for resharpening.

EXAMPLE 2

Forty-eight holes of 0.375±0.002 inch diameter were drilled. All forty-eight holes were of excellent quality. After the forty-eight hole was drilled, the diamond grit showed 5% wear, and the carbide drill showed 96% wear.

EXAMPLE 3

Fifty-four holes of 0.375±0.02 inch diameter were drilled. All but the fifty-first hole were of excellent quality. The fifty-first hole was of poor quality because the carbide drill was set too high. In addition, minor variations in hole size were noted in three of the other holes. Following the drilling of the fifty-fourth hole, there was no noticeable wear of the diamond grit. The carbide drill became dull after the drilling of the fiftieth hole and was resharpened and thereafter showed 8% wear after the drilling of the fifty-fourth hole.

EXAMPLE 4

Ninety-six holes with a diameter of 0.225±0.002 inch were drilled. The first forty-nine holes were of excellent quality. The fiftieth through sixtieth holes were of very good or good quality, the sixty-first through seventy-sixth holes were of good quality, and the remaining holes were of good or average quality. The diamond grit did not begin to show wear until after the drilling of the fifty-third hole, and at the end of the ninety-sixth hole showed 4% wear. The carbide drill was dull after the fiftieth hole but continued to produce satisfactory results as summarized above. The carbide drill was not sharpened during the testing. A consistent hole size of 0.225 was obtained until after the carbide became dull.

It will be obvious to those skilled in the art to which this invention is addressed that the invention may be used to advantage in a variety of situations. Therefore, it is intended to be understood by those skilled in the art that various changes, modifications, and omissions in form and detail may be made without departing from the spirit and scope of the invention as defined by the following claims.

What is claimed is:

1. A bit for producing and dressing holes, comprising:
   a pointed tapered drill portion including sharp cutting edge means for producing a hole, said drill portion having a first maximum diameter;
   a grinder portion including generally frustoconical abrasive outer surface portions extending generally axially inwardly from the drill portion for enlarging the hole, said grinder portion having a second maximum diameter larger than said first maximum diameter; and
   a reamer portion including essentially cylindrical abrasive outer surface portions that are axially inward continuations of said surface portions of the grinder portion for finishing the hole.

2. A bit as described in claim 1, in which the grinder portion and the reamer portion have an opening extending axially therethrough; and which comprises a shaft that has a first end which carries the drill portion and a second end and that is dimensioned to be received into said opening with said first and second ends projecting axially therefrom, and means for detachably securing the grinder portion and reamer portion to the shaft.

3. A bit as described in claim 2, in which the grinder portion and the reamer portion are integrally formed, and the drill portion and the shaft are integrally formed.

4. A bit as described in claim 2, in which the drill portion and grinder portion meet each other along a substantially circular interface with a diameter substantially equal to said first maximum diameter, and together form a substantially continuous taper.

5. A bit as described in claim 4, in which the grinder portion and the reamer portion are integrally formed, and the drill portion and the shaft are integrally formed.

6. A bit as described in claim 2, in which the drill portion has an axially inner end with a diameter equal to said first maximum diameter; and the grinder portion increases in diameter from a minimum diameter less than said first maximum diameter radially adjacent to said inner end, to said second maximum diameter, to cause the abrasive outer surface portions of the grinder portion to gradually engage sidewalls of holes.

7. A bit as described in claim 1, in which the grinder portion has an axially outer end with a diameter less than said first maximum diameter, and a slot extending radially therethrough and opening onto said outer end; and the drill portion is received into the slot and projects axially and radially outwardly from the slot at said outer end and radially outwardly from the slot from said outer end to a location intermediate said outer end and the reamer portion.

8. A bit as described in claim 7, in which the grinder portion and the reamer portion have an opening extending axially therethrough and terminating in said slot; and which comprises a shaft that has a first end which carries the drill portion and a second end and that is dimensioned to be received into said opening with said first and second ends projecting axially therefrom, and means for detachably securing the grinder portion and reamer portion to the shaft.

9. A bit as described in claim 8, in which the grinder portion and the reamer portion are integrally formed, and the drill portion and the shaft are integrally formed.

* * * * *

UNITED STATES PATENT AND TRADEMARK OFFICE
CERTIFICATE OF CORRECTION

PATENT NO. : 4,720,218

DATED : January 19, 1988

INVENTOR(S) : Rene F. DeFries and Arthur D. Riley

It is certified that error appears in the above-identified patent and that said Letters Patent are hereby corrected as shown below:

Column 1, line 62, "May 17, 1987" should be -- May 17, 1887 --.

Column 3, lines 46 and 47, "eessentially" should be -- essentially --.

Column 9, line 56, "forty-eight" should be -- forty-eighth --.

Column 9, line 61, "0.375 ± 0.02" should be -- 0.375 ± 0.002 --.

Signed and Sealed this

Nineteenth Day of July, 1988

*Attest:*

DONALD J. QUIGG

*Attesting Officer*      *Commissioner of Patents and Trademarks*